(12) United States Patent
Xue (10) Patent No.: US 8,643,694 B2
(45) Date of Patent: Feb. 4, 2014

(54) METHOD AND APPARATUS FOR ANSWERING AND RECORDING AUTOMATICALLY IN VISUAL TELEPHONE SERVICE

(75) Inventor: Tao Xue, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 146 days.

(21) Appl. No.: 13/257,965

(22) PCT Filed: Jul. 8, 2009

(86) PCT No.: PCT/CN2009/072684
§ 371 (c)(1),
(2), (4) Date: Nov. 2, 2011

(87) PCT Pub. No.: WO2010/127517
PCT Pub. Date: Nov. 11, 2010

(65) Prior Publication Data
US 2012/0044318 A1   Feb. 23, 2012

(30) Foreign Application Priority Data

May 4, 2009   (CN) .......................... 2009 1 0136141

(51) Int. Cl.
H04N 7/14      (2006.01)
H04M 1/64     (2006.01)
H04M 11/00   (2006.01)

(52) U.S. Cl.
USPC ....... 348/14.06; 379/67.1; 379/68; 379/88.13

(58) Field of Classification Search
USPC .......... 348/14.01, 14.05, 14.06, 14.07, 14.11, 348/14.12; 379/67.1, 70, 76, 85, 87, 88.13
See application file for complete search history.

(56) References Cited

U.S. PATENT DOCUMENTS

| | | | |
|---|---|---|---|
| 5,473,366 A | 12/1995 | Imaeda et al. | |
| 5,896,165 A * | 4/1999 | Rao | 348/14.06 |
| 6,072,830 A * | 6/2000 | Proctor et al. | 375/240.22 |

(Continued)

FOREIGN PATENT DOCUMENTS

| | | |
|---|---|---|
| CN | 1330482 A | 1/2002 |
| CN | 101052116 A | 10/2007 |

(Continued)

OTHER PUBLICATIONS

International Search Report for PCT/CN2009/072684 dated Feb. 2, 2010.

*Primary Examiner* — Binh Tieu
(74) *Attorney, Agent, or Firm* — Ling Wu; Stephen Yang; Ling and Yang Intellectual Property (57) ABSTRACT

The present invention provides a method and apparatus for implementing automatic answering and recording in videophone services. The method comprises: when a video call is coming, a called terminal automatically answering the call and playing a prerecorded automatic answering prompting message to a calling user; and the called terminal recording audio and video of the calling user and ending the call after the recording is completed. The present invention has solved the problem that a videophone has no automation answering and recording function in prior art. Thus, the user can answer selectively video calls at anytime and anywhere, important video calls can be automatically recorded, and video calls which are inconvenient to be answered can be answered automatically by choosing various videos.

15 Claims, 4 Drawing Sheets

(56) References Cited

U.S. PATENT DOCUMENTS

| | | | |
|---|---|---|---|
| 6,385,305 B1* | 5/2002 | Gerszberg et al. | 379/88.13 |
| 6,509,924 B2* | 1/2003 | Honguu et al. | 348/14.06 |
| 2002/0046407 A1* | 4/2002 | Franco | 725/110 |
| 2003/0041333 A1* | 2/2003 | Allen et al. | 725/106 |
| 2003/0112929 A1 | 6/2003 | Chuang | |
| 2006/0123150 A1* | 6/2006 | Iwai et al. | 710/15 |
| 2009/0092234 A1* | 4/2009 | Onge et al. | 379/88.13 |
| 2009/0097820 A1* | 4/2009 | Furuyama | 386/83 |
| 2009/0279675 A1* | 11/2009 | Xu et al. | 379/85 |
| 2010/0026817 A1* | 2/2010 | Ryan et al. | 348/207.11 |
| 2010/0074252 A1* | 3/2010 | Culver | 370/352 |
| 2010/0197345 A1* | 8/2010 | Bawareth | 455/557 |
| 2011/0030018 A1* | 2/2011 | Mizuno et al. | 725/88 |
| 2011/0063440 A1* | 3/2011 | Neustaedter et al. | 348/143 |
| 2013/0003944 A1* | 1/2013 | Dunsmuir | 379/88.01 |

FOREIGN PATENT DOCUMENTS

| | | |
|---|---|---|
| CN | 101610378 A | 12/2009 |
| EP | 661880 B1 | 3/2003 |
| JP | 3136546 A | 6/1991 |

\* cited by examiner

METHOD AND APPARATUS FOR ANSWERING AND RECORDING AUTOMATICALLY IN VISUAL TELEPHONE SERVICE

TECHNICAL FIELD

The present invention relates to the field of communication technology, and more particularly, to a method and apparatus for implementing automatic answering and recording in videophone services.

BACKGROUND ART

Videophone, which belongs to the category of multimedia communications, is a video conference system with wide application areas such that people can see the face of whom they are talking with. Videophone can not only be applied to family life but also be widely applied to various areas, such as commercial activities, remote education, security monitoring, hospital nursing, medical diagnosis and scientific research, thus it has very broad market prospects.

However, the existing videophone has not yet automatic answering and recording function so that some problems, such as calls being unable to be answered selectively, some important video calls being missed, video calls being unable to be answered in some occasions, etc., have been brought about, thus often making users feel inconvenient and further affecting the popularization and application of the videophone.

SUMMARY OF THE INVENTION

In view of the above-described analysis, the present invention intends to provide a method and apparatus for implementing automatic answering and recording in videophone services to solve the problem that a videophone has no automatic answering and recording function in prior art.

The object of the present invention is achieved mainly by the following technical scheme.

The present invention provides a method for implementing automatic answering and recording in videophone services comprising:

step A: when a video call is coming, a called terminal automatically answering the call and playing a prerecorded automatic answering prompting message to a calling user; and step B: the called terminal recording audio and video of the calling user and ending the call after the recording is completed.

Further, the step A may comprise:

step A1: when the video call is coming, determining whether a calling number is a number which is required to be answered automatically;

step A2: determining whether the call is required to be answered with delay when the calling number is the number which is required to be answered automatically, and if yes, step A3 is performed after delay time is set, otherwise step A3 is performed directly; and step A3: playing the automatic answering prompting message to the calling user.

Further, the step A may also comprise: when a called user is required to answer the incoming video call, ending the playing of the automatic answering prompting message and sending current audio and video of the called user to the calling user such that the two users talk with each other.

Further, the step B may comprise:

step B1: determining whether automatic recording is performed, and if yes, the audio and video of the calling user is recorded, otherwise the recording commences after it is confirmed that a response of the calling user requesting the recording has been received; and step B2: determining whether the calling user sends a response of stopping the recording, and if yes, the recording is stopped, otherwise the audio and video of the calling user continues to be recorded until the recording is completed.

The step B1 may further comprise:

determining whether there is recording time length limitation when the audio and video of the calling user commences to be recorded, and if yes, the audio and video of the calling user commences to be recorded after the recording time length is set, otherwise the audio and video of the calling user commences directly to be recorded.

The step B2 may comprise:

step B21: determining whether the calling user sends the response of stopping the recording, and if yes, step B22 is performed, otherwise the recording continues;

step B22: stopping the recording and determining whether the calling user needs playback of the video recording, and if yes, the video recording is played back to the calling user and then step B23 is performed, otherwise the recording is ended and the call is terminated;

step B23: determining whether a response of the calling user confirming the video recording is received, and if yes, the recording is ended and the call is terminated, otherwise step B24 is performed; and step B24: determining whether a request of the calling user deleting the video recording and recommencing recording is received, and if yes, the video recording is deleted and the audio and video of the calling user recommences to be recorded, otherwise step B23 is performed.

Further, the step B may also comprise:

when the called user needs to restore the call, the called terminal ending the recording being performed the calling user and sending the current audio and video of the called user to restore the call.

Further, the automatic answering prompting message may comprise audio, video, audio and video or pictures which indicate the calling user that the called terminal is currently in an automatic answering state.

The present invention also provides an apparatus for implementing automatic answering and recording in videophone services comprising a transmitting module, a receiving module, a display module, a storage module and a control module.

The transmitting module is configured to send a prerecorded automatic answering prompting message or a prompting message that is being recorded to a calling user.

The receiving module is configured to receive and send video recorded for the calling user to the storage module, and receive the calling user's response message to the video recording to send to the control module.

The display module is configured to display the automatic answering prompting message, the prompting message that is being recorded or the video recorded for the calling user.

The storage module is configured to store the automatic answering prompting message, the prompting message that is being recorded or the video recorded for the calling user.

The control module is configured to invoke the transmitting module to send the automatic answering prompting message or the prompting message that is being recorded to the calling user, and further configured to invoke the display module to display the automatic answering prompting message, the prompting message that is being recorded or the video recorded for the calling user, and commence or end the recording for the calling user according to the calling user's response to the recording transmitted by the receiving module.

Further, the receiving module is also configured to receive a response of the calling user playing back the video recording or deleting the video recording; and the control module is also configured to invoke and play the video recorded for the calling user stored in the storage module according to the response of the calling user playing back the video recording transmitted by the receiving module; and the control module is configured to delete the video recorded for the calling user stored in the storage module according to the response of the calling user deleting the video recording transmitted by the receiving module.

Other features and advantages of the present invention will be expatiated in the following description, and some of the features and advantages may become apparent from the description or may be understood by implementing the present invention. The object and other advantages of the present invention can be implemented and obtained through structures illustrated specially in the description, claims and accompanying figures.

PREFERRED EMBODIMENTS OF THE INVENTION

The preferred embodiments of the present invention will be described in detail in conjunction with the accompanying figures, which constitute a portion of the present application and which, along with the embodiments of the present invention, are used to elaborate the principle of the present invention. For the purpose of clarification and simplification, the well known functions and structures of the apparatus described herein will be omitted so as not to obscure the subject matter of the present invention.

A method in accordance with the embodiment of the present invention will be described in detail in conjunction with FIG. 1 to FIG. 4.

Figure 1:
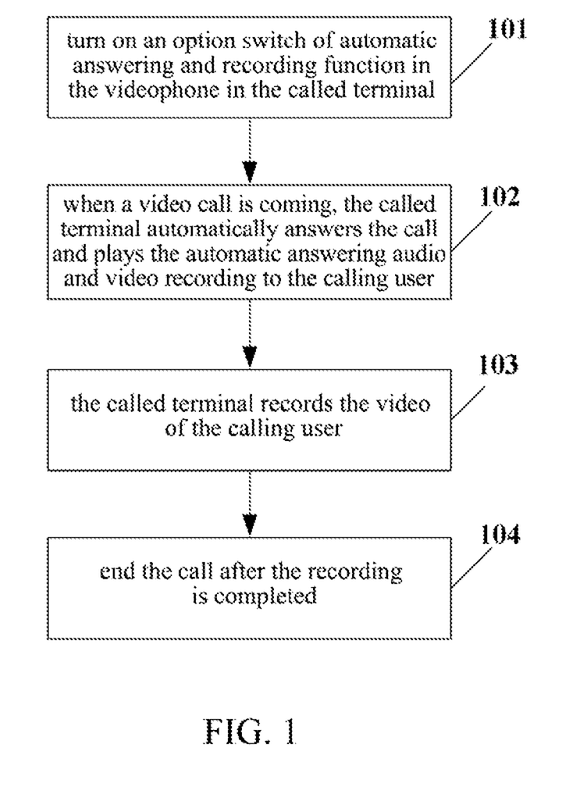
FIG. 1 is a flow chart of a method in accordance with an embodiment of the present invention.

FIG. 1 is a flow chart of the method in accordance with the embodiment of the present invention which specifically comprises the following steps.

Step 101: an option switch for automatic answering and recording function of a videophone is turned on in a called terminal.

The option of the automatic answering and recording function of the videophone may be configured for all incoming calls, group incoming calls, some of incoming calls, a certain incoming call, a certain incoming phone number of a user; the option of the automatic answering and recording function of the videophone may also be configured for the above-mentioned incoming phone numbers within a certain time period; the option of the automatic answering and recording function of the videophone may also be configured to answer immediately or with a delay of a time period; if a user has not yet configured the option of the automatic answering and recording function of the videophone, he/she can still select automatic answering in an incoming call interface.

Step 102: when a video call is coming, the called terminal automatically answers the call and plays a automatic answering prompting message to a calling user.

The automatic answering prompting message may be a user-prerecorded audio and video, audio, video or pictures which indicate the calling user that the called terminal is currently in an automatic answering state. In this embodiment, audio and video recording which indicates the calling user that the called terminal is currently in the automatic answering state is used; wherein, the automatic answering audio and video recording may be played once, several times, or repeatedly until the user hangs up.

Step 103: the called terminal records video of the calling user.

The called terminal may commence to record the video of the calling user upon the call, or when the playing of the automatic answering audio and video recording is completed, or when a response of the calling user requesting the recording is received during the playing of the automatic answering video and audio recording. The response of the calling user requesting the recording may be achieved by various methods, such as sending a frame of picture containing request information or a DTMF (Dual Tone Multiple Frequency) signal.

As soon as the called terminal commence to record the video of the calling user, it stops the playing of the automatic answering audio and video recording to the calling user and plays instead a prompt message that is being recorded recording is being performed, which may also be user-prerecorded audio and video, audio, video or pictures which indicate to the calling user that the called terminal is currently performing the recording. In this embodiment, audio and video recording that indicates to the calling user that the called terminal is currently performing the recording is used.

During the process of automatic answering, if the called user needs to answer the call, the called mobile terminal ends the playing of the current automatic answering audio and video recording and sends its own current audio and video recording to the calling user such that both parties can talk.

When the called terminal is recording the video of the calling user, if a called user needs to answer the call, then it should end the playing of the audio and video recording being recorded, and sends its own current audio and video recording to the calling user such that both parties can talk.

In addition, there may be time length limitation when the called terminal records the video of the calling user, or the recording may continue as long as there is storage space.

Step 104, the call ends after the recording is completed.

If a response of the recording for the calling user ending is received when the called terminal records the video of the calling user, the recording should be ended and the calling user is indicated whether he/she needs the playback of the audio and video just recorded. If the calling user is not satisfied after the playback and the audio and video are required to be re-recorded, then the calling user needs to send a response of deleting the played video recording and recommencing recording and the called terminal recommences recording. If it is confirmed that the played video recording is correct, the calling user will indicate the called terminal that the recording is completed and end the call. The response of the recording for the calling user ending, the response of whether the playback being needed, the response of deleting the played video recording and recommencing recording, the response of confirming that the played video recording is correct, etc., may be achieved by sending a frame of picture containing request information or a DTMF signal.

Figure 2:
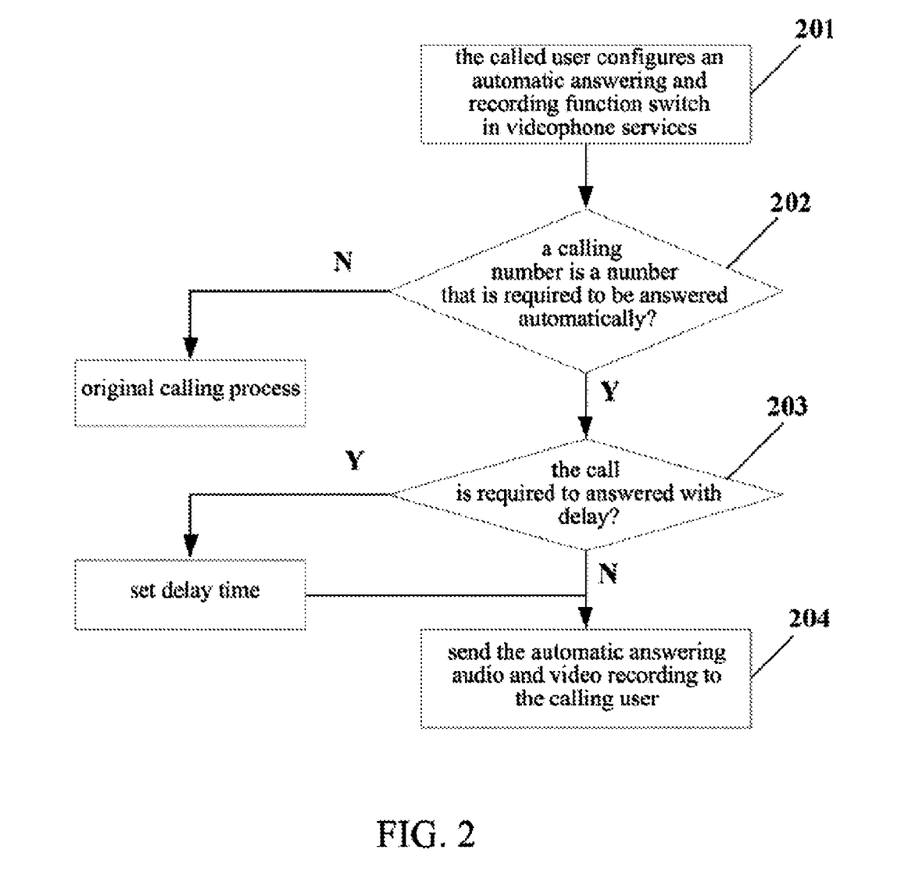
FIG. 2 is a flow chart of automatic answering in videophone services in the method in accordance with an embodiment of the present invention.

FIG. 2 is a flow chart of automatic answering in videophone services in the method in accordance with an embodiment of the present invention. The method may specifically comprise the following steps.

Step 201: the called user configures an automatic answering and recording function switch of a videophone.

Step 202: when a video call is coming, it is determined whether a calling number is a number that is required to be answered automatically, and if yes, step 203 is performed, otherwise the original calling process is performed.

Step 203: it is determined whether the call is required to be answered with delay, and if yes, delay time is set and step 204 is performed, otherwise step 204 is performed directly.

Step 204: automatic answering audio and video recording is sent to the calling user and the call commences.

Figure 3:
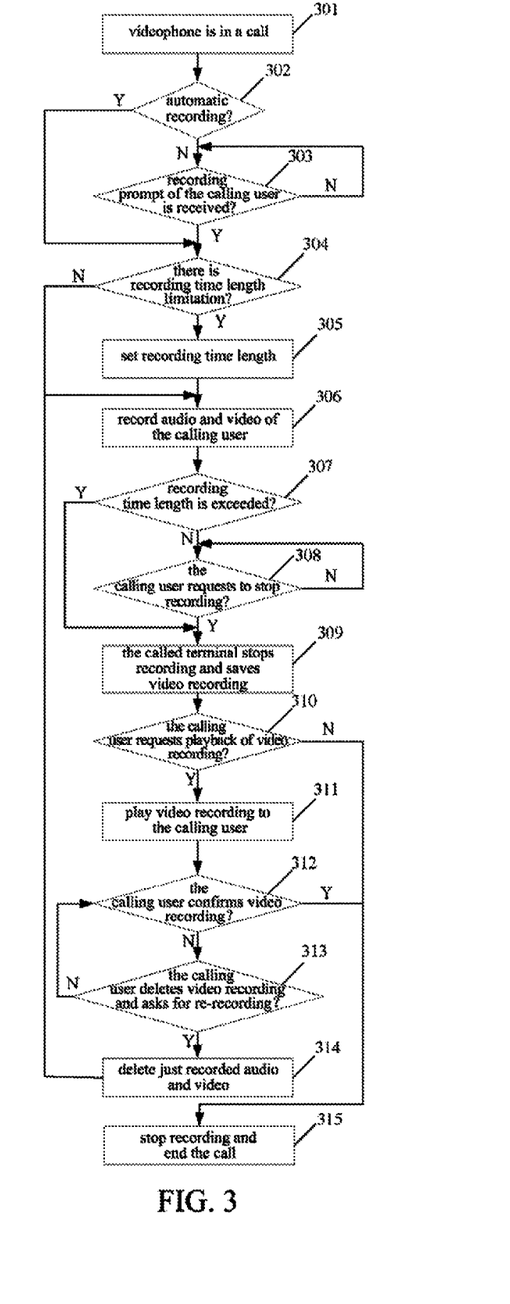
FIG. 3 is a flow chart of automatic answering and recording in videophone services in the method in accordance with an embodiment of the present invention.

FIG. 3 is a flow chart of automatic answering and recording in videophone services in the method in accordance with an embodiment of the present invention. The portion of automatic answering is the same as that in FIG. 2 and will not be repeated any more. The automatic answering and recording specifically comprises the following steps.

Step 301: the videophone is in a call.

Step 302: it is determined whether automatic recording is needed, and if yes, step 304 is performed, otherwise step 303 is performed.

Step 303: it is determined whether the response of the calling user requesting the recording is received, and if yes, step 304 is performed, otherwise waiting continues and the step 303 is performed.

Step 304: it is determined whether there is recording time length limitation, and if yes, step 305 is performed, otherwise step 306 is performed.

Step 305: after the time length is set, step 306 is performed.

Step 306: the audio and video of the calling user commences to be recorded.

Step 307: it is determined whether the recording time length limitation is exceeded, and if yes, step 309 is performed, otherwise step 308 is performed.

Step 308: it is determined whether the calling user sends a response of stopping the recording, and if yes, step 309 is performed, otherwise the recording continues until the calling user send the response of stopping the recording.

Step 309: the called terminal stops the recording and stores the recorded video.

Step 310: it is determined whether the calling user needs to the playback of the video recording, and if yes, step 311 is performed, otherwise the recording process is ended and the call ends.

Step 311: the recorded video are played back to the calling user.

Step 312: it is determined whether a response of the calling user confirming the video recording is received, and if yes, the recording process is ended and the call ends, otherwise step 313 is performed.

Step 313: it is determined whether a response of the calling user deleting the video recording and commencing recording is received, and if yes, step 314 is performed, otherwise step 312 is performed.

Step 314: the video just recorded is deleted and step 306 is performed.

The response of the calling user requesting the recording, the response of the recording for the calling user ending, the response of whether the playback being needed, the response of deleting the played video recording and recommencing recording, the response of confirming that the played video recording is correct, etc., may be achieved by send a frame of picture containing request information or a DTMF signal.

Figure 4:
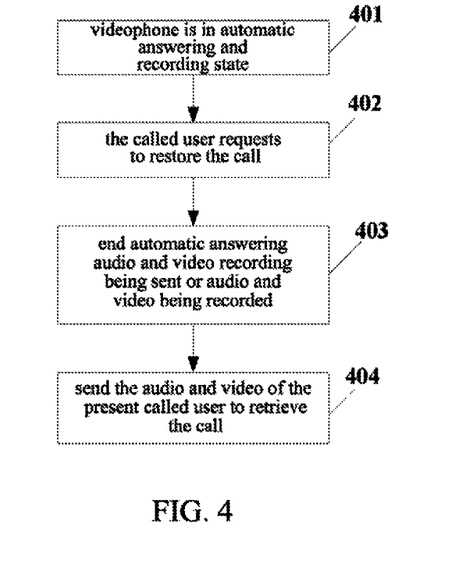
FIG. 4 is a flow chart of restoring a call in the process of automatic answering and recording in videophone services in the method in accordance with an embodiment of the present invention.

FIG. 4 is a flow chart of restoring a call in the process of automatic answering and recording in the videophone services in the method in accordance with an embodiment of the present invention. The method may specifically comprise the following steps.

Step 401: the videophone is in an automatic answering and recording state.

Step 402: the called user asks for restoring the call.

Step 403: the automatic answering audio and video recording being currently sent or the audio and video being recorded are ended.

Step 404: the audio and video of the current called user is sent and the call is restored.

An apparatus in accordance with an embodiment of the present invention will be described in detail in conjunction with FIG. 5.

Figure 5:
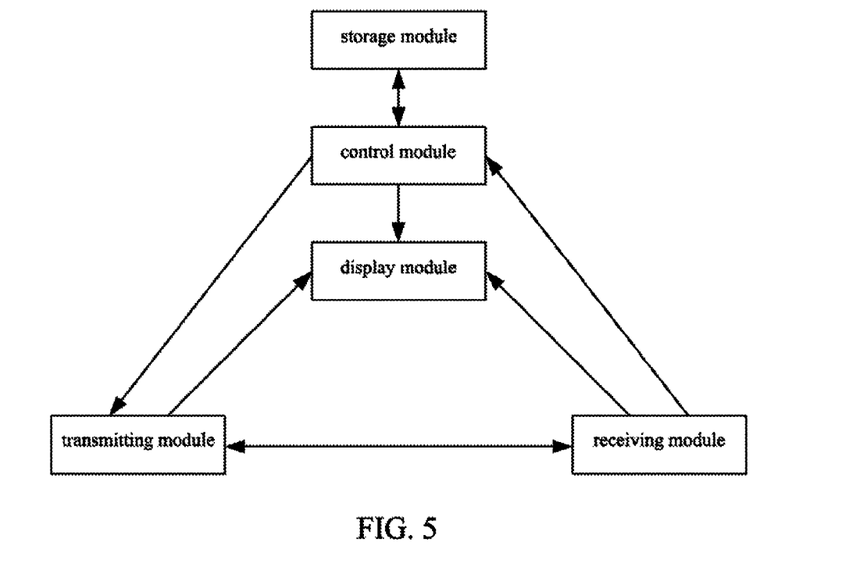
FIG. 5 is a block diagram of an apparatus in accordance with an embodiment of the present invention.

FIG. 5 is a block diagram of an apparatus in accordance with an embodiment of the present invention, which specifically comprises a transmitting module, a receiving module, a display module, a storage module and a control module.

The transmitting module is configured to send a automatic answering prompting message or a prompting message that is being recorded to the calling user when a called terminal answers a call automatically. The prompting messages may be use-prerecorded audio, video, audio and video or pictures which indicate the calling user that the called terminal is currently in an automatic answering state. The automatic answering prompting message may be played once, several times, or repeatedly until the calling user hangs up.

The receiving module is configured to receive the audio and video recording of the calling user and send it to the storage module, and receive the calling user's response messages to the audio and video recording and send it to the control module; wherein, the calling user's response messages to the audio and video recording comprises a response of the calling user requesting the recording, a response of the recording for the calling user ending, a response of whether playback being needed, a response of deleting the played video recording and recommencing recording, a response of confirming that the played video recording is correct, etc. These messages may be achieved by sending a frame of picture containing request information or a DTMF signal.

The display module is configured to display the current audio and video of the calling user or the audio and video recording sent to the calling user, i.e., the automatic answering audio and video recording, the audio and video being recorded or the video recorded for the calling user.

The storage module is configured to store the automatic answering prompting audio and video recording or the audio and video being recorded and to receive and store the video recorded for the calling user sent by the receiving module.

The control module is configured to invoke the transmitting module to transmit the automatic answering audio and video recording to the calling user when the called terminal answers a call automatically; invoke the transmitting module to transmit the audio and video being recorded when the video of the calling user is recorded; and invoke the display module to display the current audio and video of the calling user and the audio and video recording sent to the calling user during a videophone call, and select different operations according to the calling user's different responses to the video recording which are transmitted by the receiving module. For example, when the response of the calling user requesting the recording is received, the control module commences to record the audio and video of the calling user (or commences to record the audio and video of the calling user using the existing recording function of the called terminal). When the response of the recording for the calling user ending is received, the control module stops recording the audio and video of the calling user. When the response of the calling user needing the playback, the control module invokes and plays the audio and video recorded for the calling user. When the response of deleting the played video recording, the control module deletes the audio and video recording of the calling user stored in the storage module.

The specific processing procedure of the apparatus in accordance with the embodiment of the present invention has been described in detail in the methods described above and will not be repeated herein.

To sum up, the embodiments of the present invention provide a method and apparatus for implementing automatic answering in the videophone services to make fully use of the simplicity and modifiability of upgrade of user terminal software such that the videophone services can have automatic answering and recording function by only modifying appropriately the user terminal software. Thus, the user can answer selectively video calls at anytime and anywhere, important video calls can be automatically recorded, and video calls which are inconvenient to be answered can be answered automatically by choosing various videos, thereby greatly improving usability of a mobile terminal and fine reputation of user experience in the 3G era.

The apparatus for implementing automatic answering and recording in videophone services disclosed in the embodiment of the present invention may be applied to different types of phone terminals so as to implement conveniently automatic answering and recording function in the videophone services. Telecommunication operators need to modify only user terminal software appropriately (add the corresponding service software module) to meet the requirements.

The embodiments described above are only the preferred embodiments of the present invention. However, the scope of the present invention is not limited thereto. Variations or substitutions which occur to those skilled in the art within the disclosed technical scope of the present invention should be covered in the protection scope of the present invention. Therefore, the protection scope of the present invention should be subject to the protection scope of the appended claims.

INDUSTRIAL APPLICABILITY

The present invention has solved the problem that a videophone has no automation answering and recording function in prior art. Thus, the user can answer

I claim:

1. A method for implementing automatic answering and recording in videophone services comprising:
 step A: when a video call is coming, a called terminal automatically answering the call and playing a prerecorded automatic answering prompting message to a calling user; and
 step B: the called terminal recording audio and video of the calling user and ending the call after the recording is completed, wherein the called terminal deletes the video recorded for the calling user and recommences to record the audio and video of the calling user when the called terminal receives a response of the calling user deleting the video recording and recommencing recording.

2. The method according to claim 1, wherein the step A comprises:
 step A1: when the video call is coming, determining whether a calling number is a number which is required to be answered automatically;
 step A2: determining whether the call is required to be answered with delay when the calling number is the number which is required to be answered automatically, and if yes, step A3 is performed after delay time is set, otherwise step A3 is performed directly; and
 step A3: playing the automatic answering prompting message to the calling user.

3. The method according to claim 2, wherein the step A further comprises:
 when a called user is required to answer the incoming video call, ending the playing of the automatic answering prompting message and sending current audio and video of the called user to the calling user such that the two users talk with each other.

4. The method according to claim 2, wherein the automatic answering prompting message comprises audio, video, audio and video or pictures which indicate the calling user that the called terminal is currently in an automatic answering state.

5. The method according to claim 1, wherein the step A further comprises:
 when a called user is required to answer the incoming video call, ending the playing of the automatic answering prompting message and sending current audio and video of the called user to the calling user such that the two users talk with each other.

6. The method according to claim 1, wherein the step B comprises:
 step B1: determining whether automatic recording is performed, and if yes, the audio and video of the calling user is recorded, otherwise the recording commences after it is confirmed that a response of the calling user requesting the recording has been received; and
 step B2: determining whether the calling user sends a response of stopping the recording, and if yes, the recording is stopped, otherwise, the audio and video of the calling user continue to be recorded until the recording is completed.

7. The method according to claim 6, wherein the step B1 further comprises:
 determining whether there is recording time length limitation when the audio and video of the calling user commences to be recorded, and if yes, the audio and video of the calling user commences to be recorded after the recording time length is set, otherwise the audio and video of the calling user commences directly to be recorded.

8. The method according to claim 7, wherein the step B further comprises:
 when the called user needs to restore the call, the called terminal ending the recording being performed for the calling user and sending the current audio and video of the called user to restore the call.

9. The method according to claim 6, wherein the step B2 comprises:
 step B21: determining whether the calling user sends the response of stopping the recording, and if yes, step B22 is performed, otherwise the recording continues;
 step B22: stopping the recording and determining whether the calling user needs to playback of the video recording, and if yes, the video recording is played back to the calling user and then step B23 is performed, otherwise the recording is ended and the call is terminated;

step B23: determining whether a response of the calling user confirming the video recording is received, and if yes, the recording is ended and the call is terminated, otherwise step B24 is performed; and step B24: determining whether a request of the calling user deleting the video recording and recommencing recording is received, and if yes, the video recording is deleted and the audio and video of the calling user recommences to be recorded, otherwise step B23 is performed.

10. The method according to claim 9, wherein the step B further comprises:

when the called user needs to restore the call, the called terminal ending the recording being performed for the calling user and sending the current audio and video of the called user to restore the call.

11. The method according to claim 6, wherein the step B further comprises:

when the called user needs to restore the call, the called terminal ending the recording being performed for the calling user and sending the current audio and video of the called user to restore the call.

12. The method according to claim 1, wherein the step B further comprises:

when the called user needs to restore the call, the called terminal ending the recording being performed for the calling user and sending the current audio and video of the called user to restore the call.

13. The method according to claim 1, wherein the automatic answering prompting message comprises audio, video, audio and video or pictures which indicate the calling user that the called terminal is currently in an automatic answering state.

14. An apparatus for implementing automatic answering and recording in videophone services comprising a transmitting module, a receiving module, a display module, a storage module and a control module, wherein the transmitting module is configured to send a prerecorded automatic answering prompting message or a prompting message that recording is being performed to a calling user;

the receiving module is configured to receive and send video recorded for the calling user to the storage module, and receive the calling user's response message to the video recording to send to the control module;

the display module is configured to display the automatic answering prompting message, the prompting message that recording is being performed, or the video recorded for the calling user;

the storage module is configured to store the automatic answering prompting message, the prompting message that recording is being performed, or the video recorded for the calling user; and the control module is configured to invoke the transmitting module to send the automatic answering prompting message or the prompting message that recording is being performed to the calling user, and further configured to invoke the display module to display the automatic answering prompting message, the prompting message that recording is being performed, or the video recorded for the calling user, and commence or end the recording for the calling user according to the calling user's response to the recording transmitted by the receiving module;

wherein the receiving module is further configured to receive a response of the calling user deleting the video recording and recommencing recording; and the control module is further configured to delete the video recorded for the calling user stored in the storage module and recommence to record the audio and video of the calling user according to the response of the calling user deleting the video recording and recommencing recording transmitted by the receiving module.

15. The apparatus according to claim 14, wherein the receiving module is further configured to receive a response of the calling user playing back the video recording; and the control module is further configured to invoke and play the video recorded for the calling user stored in the storage module according to the response of the calling user playing back the video recording transmitted by the receiving module.

* * * * *